(12) United States Patent
Dunleavy et al.

(10) Patent No.: US 8,801,992 B2
(45) Date of Patent: Aug. 12, 2014

(54) PROCESS FOR MANUFACTURING A STRUCTURAL PART MADE OF AN ORGANIC MATRIX COMPOSITE AND PART OBTAINED

(75) Inventors: Patrick Dunleavy, Palaiseau (FR); Richard Masson, Buc (FR)

(73) Assignee: Messier-Bugatti-Dowty, Velizy-Villacoublay (FR)

( * ) Notice: Subject to any disclaimer, the term of this patent is extended or adjusted under 35 U.S.C. 154(b) by 529 days.

(21) Appl. No.: 12/997,785

(22) PCT Filed: Jun. 12, 2009

(86) PCT No.: PCT/EP2009/057291
§ 371 (c)(1),
(2), (4) Date: Dec. 13, 2010

(87) PCT Pub. No.: WO2009/153220
PCT Pub. Date: Dec. 23, 2009

(65) Prior Publication Data
US 2011/0129639 A1    Jun. 2, 2011

(30) Foreign Application Priority Data
Jun. 13, 2008  (FR) .................................... 08 03323

(51) Int. Cl.
*B32B 3/06*    (2006.01)

(52) U.S. Cl.
USPC ............ 264/259; 264/103; 264/236; 264/257

(58) Field of Classification Search
USPC .................................. 264/103, 236, 257, 259
See application file for complete search history.

(56) References Cited

U.S. PATENT DOCUMENTS

| | | | | |
|---|---|---|---|---|
| 4,248,062 A | * | 2/1981 | McLain et al. | 464/181 |
| 4,469,730 A | * | 9/1984 | Burhans | 428/36.3 |
| 4,519,290 A | | 5/1985 | Inman et al. | |
| 4,704,918 A | * | 11/1987 | Orkin et al. | 74/579 R |
| 4,851,065 A | * | 7/1989 | Curtz | 156/172 |
| 4,992,313 A | * | 2/1991 | Shobert et al. | 428/36.1 |

(Continued)

FOREIGN PATENT DOCUMENTS

EP    1 798 428    6/2007

OTHER PUBLICATIONS

International Search Report issued Sep. 28, 2009 in PCT/EP09/057291 filed Jun. 12, 2009.
U.S. Appl. No. 13/002,514, filed Jan. 4, 2011, Dunleavy, et al.

(Continued)

*Primary Examiner* — Matthew Daniels
*Assistant Examiner* — Saeed Huda
(74) *Attorney, Agent, or Firm* — Oblon, Spivak, McClelland, Maier & Neustadt, L.L.P.

(57) ABSTRACT

A process for manufacturing a structural part made of an organic matrix composite including: production of a fibrous structure, forming a preform by braiding rovings of a fibrous material on a mandrel that includes a reinforcement in its axial extension, impregnation of the preform with an organic resin; and curing of this resin, the reinforcement, forming the cover, having a bore with an axis perpendicular to the axis for housing a connecting member. Barbs, some of which are projecting, are incorporated into the reinforcement over at least part of the surface of which lying on either side of the bore, the braiding being carried out around the barbs so that the rovings at least partly criss-cross around the barbs.

10 Claims, 3 Drawing Sheets

(56) References Cited

U.S. PATENT DOCUMENTS

| | | | | |
|---|---|---|---|---|
| 5,397,272 A | * | 3/1995 | Smiley et al. | 464/181 |
| 5,571,357 A | * | 11/1996 | Darrieux et al. | 156/173 |
| 5,683,300 A | * | 11/1997 | Yasui et al. | 464/181 |
| 6,379,763 B1 | * | 4/2002 | Fillman | 428/36.9 |
| 7,427,237 B2 | * | 9/2008 | Burkett | 464/181 |
| 8,205,315 B2 | * | 6/2012 | Mullen et al. | 29/447 |
| 2007/0152105 A1 | | 7/2007 | Filsinger et al. | |
| 2008/0157519 A1 | * | 7/2008 | Mullen et al. | 285/290.1 |

OTHER PUBLICATIONS

U.S. Appl. No. 13/002,580, filed Jan. 4, 2011, Dunleavy, et al.

* cited by examiner

PROCESS FOR MANUFACTURING A STRUCTURAL PART MADE OF AN ORGANIC MATRIX COMPOSITE AND PART OBTAINED

BACKGROUND OF THE INVENTION

1. Field of the Invention

The present invention relates to a structural component made of organic matrix fiber composite, for use notably in the aeronautical field.

2. Description of the Related Art

The use of fiber-reinforced composites has been developed in the aeronautical field because such materials allow the production of components that are even more lightweight than can be achieved using metallic materials and allow the structures obtained from assembling such components to be simplified; in particular, the number of components can thus be reduced. The components are obtained for example by laying up laps of fibers preimpregnated with resin then by curing these or alternatively by producing a preform using dry fibers which are then impregnated with resin inside a mold in which a vacuum is created and into which the resin is injected at low pressure.

The present invention relates to the manufacture of components from at least in part dry fibers. The fibrous part is generally formed of small-diameter fibers bundled in rovings or strands. The fibers are, for example, made of carbon, glass or alternatively of a material such as aramid.

One way of producing structural components such as link rods which may or may not have a hollow body involves forming a fibrous structure by winding, weaving, knitting or braiding dry rovings along a mandrel the overall contour of which is that of the component that is to be obtained. The fibrous structure may be formed of one or a plurality of layers or may alternatively be of the three-dimensional type, depending on the properties, such as strength, desired. The assembly comprising the mandrel and the fibrous structure covering it is then impregnated with a resin which, after curing, forms a matrix incorporating the fibrous elements. The mandrel may be removed or eliminated from the preform obtained or alternatively may be left in situ if lightweight. The preform obtained may or may not thus be hollow, possibly of axisymmetric shape, of revolution or otherwise. It is then machined and, as appropriate, fitted with ancillary parts to form the definitive structural element.

If the component is to be assembled with other components to form a structure, then one or more longitudinal extension (s) of the wall of the body of the preform may be provided in order to create end fittings that form interfaces with the other elements of the structure into which the component is to be incorporated. Once the preform has been cured, the extensions are holed and possibly routed in order to obtain the end fittings. The formation of the holes in the end fitting may also be scheduled to take place at the start of manufacture.

The applicant company has already proposed a novel way of producing one or more end fitting(s) on a composite structural element. Patent application FR 2 893 532 describes a process for manufacturing an end fitting on such an element produced at least locally from a stack of primary plies of composite fibers.

The applicant company has now set its sights on a novel way of producing one or more end fitting(s) on a composite structural element produced by braiding a fibrous material onto a mandrel and impregnating the resultant preform with an organic resin.

U.S. Pat. No. 6,890,470 discloses a method of manufacturing a structural element made of fiber composite. A fibrous material in the form of rovings is applied in an automatic circular weaving operating to a double mandrel, possibly with pre-woven reinforcing layers incorporated between two layers; one of the mandrels is removed; the free woven part is then shaped into, for example, flanges, and everything is impregnated with resin using, for example, the known RTM technique and the second mandrel is then eliminated from the preform obtained. In an alternative form of embodiment, textile reinforcing elements are incorporated between the various layers of the weaving toward one longitudinal end of the preform. That end remains open and creates two extensions in the wall of the preform which extensions constitute interfaces to accept a member for connection to another structural component. This solution entails the production of a double end-fitting, or yoke from the wall of the preform.

U.S. Pat. No. 4,704,918 is known and relates to a force transmission rod comprising a longitudinal mandrel and reinforcing elements at the ends. The entire assembly is covered by a textile covering impregnated with resin. Pins positioned transversely in the reinforcing elements catch on the covering. The reinforcing elements end in a threaded hole directed along the axis of the rod so that a connecting member can be attached by screwing in.

A novel way of creating an interface with the structural component is proposed which improves the ability to withstand both compressive and tensile loading effectively in the connecting region while being simple to produce.

BRIEF SUMMARY OF THE INVENTION

According to the invention, the process of manufacturing a structural component with an end fitting made from an organic matrix composite involving the production of a fiber structure that forms a preform by braiding rovings of a fibrous material onto a mandrel comprising a reinforcement in its axial extension, impregnating the fibrous structure with an organic resin, and curing the latter, said reinforcement forming said end fitting comprising a bore the axis of which is perpendicular to the axis of the mandrel to house a connecting member, is characterized in that incorporated into the reinforcement over at least part of the surface thereof that lies on each side of said bore are pins part of which projects, braiding being performed around the pins such that the rovings of the fibrous structure crisscross one another at least partially around these pins.

For a component such as a landing gear link rod, a reinforcement is positioned at each end of the mandrel.

The reinforcement preferably consists of a fibrous material and, more particularly, the reinforcement is formed of a fibrous material impregnated with organic resin.

According to one embodiment, the reinforcement forms a block with a rectangular or elliptical cross section.

The end fitting is pierced with a bore in which can be housed a member, such as a pin in a ring, for connection with some other element of the structure. Loads between the ring of the connecting member mounted on the end fitting and the fibers of the braiding of the preform are transmitted, in respect of the part of the ring that is in contact with the reinforcement, by successive shear between the end fitting reinforcement and the matrix then between the matrix and the fibers of the fibrous structure. To improve the mechanical integrity of the component when this component is subjected to tensile or compressive forces, a means, via the pins, is set in place to ensure that load is transmitted directly between the connecting member and the fibers of the braided fibrous structure thus strengthening the bond between the braided fibrous structure and the reinforcing component.

For preference, the pins are arranged in a grid pattern, the spacing between the pins allowing at least one roving and the crossing of two rovings to be accommodated therein. The height of the pins is at most equal to the height of the braiding.

The pins are incorporated into the reinforcement either in a first region situated between the mandrel and the region of the bore in order to improve the integrity and encourage the transmission of compressive load, or in a second region situated on the other side of the bore to the mandrel in order to improve the integrity and encourage the transmission of tensile load or in both said first region and said second region.

According to another feature, the pins are made of metal or of carbon.

BRIEF DESCRIPTION OF THE SEVERAL VIEWS OF THE DRAWINGS

The invention is now described in greater detail with reference to the appended drawings of one embodiment and in which.

DETAILED DESRIPTION OF THE INVENTION

Figure 1:
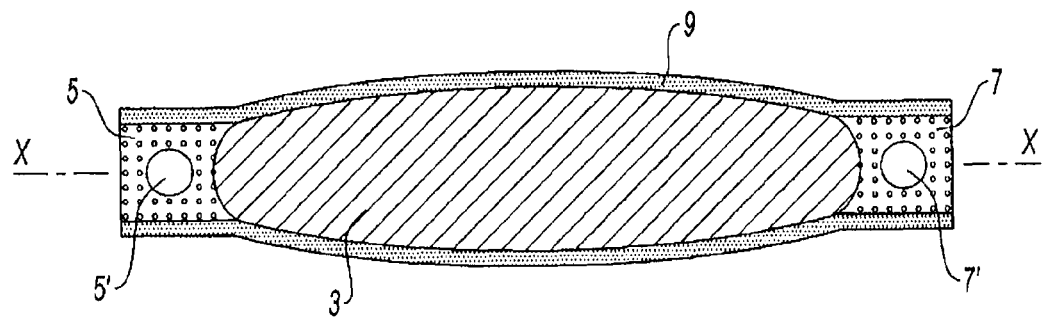
FIG. 1 schematically depicts a preform according to the invention, viewed in axial section.

As can be seen in FIG. 1, a structural component in the aeronautical field, such as a landing gear link rod, is formed from a preform comprising a mandrel 3 the contours of which are similar to that of the final component. This is one exemplary embodiment of the invention. It is nonlimiting. The mandrel is cylindrical, ovoid overall, with a main axis XX, and is closed at its ends which have a rounded shape. This is an ancillary element over which the component is molded. It needs potentially to be able to be eliminated without difficulty once it has performed its function of internally molding the component. For example, the material may be fluidized and eliminated. However, depending on circumstance, for example if it is sufficiently lightweight, it is left in situ. It may notably be made of a resin impregnated fibrous material. The length of the mandrel is that of the final component, not including interfaces.

A reinforcement, 5 and 7 respectively, is placed at the two ends of the mandrel 3. This reinforcement is of substantially parallepipedal shape with one face shaped so that it fits the contour of the end of the mandrel. It is advantageously made of a fibrous material. A bore 5' and 7' passes through the reinforcement at right angles to the main axis of the component 1. It acts as a housing for a future connecting member with ring or the like, not depicted, for connecting to some other component of the structure. The bores may be created after the resin has cured.

The reinforcing component is obtained for example by laying up laps of resin preimpregnated fibers then by curing these or alternatively by creating a preform of dry fibers which is then impregnated with resin inside a mold in which a vacuum has been created and into which the resin is injected at low pressure.

The assembly comprising the mandrel and the reinforcement is covered with a fibrous structure 9 made up of rovings of fibers braided along the mandrel. The fibers are generally made of glass, carbon, boron or alternatively of aramid material such as the material known by the trade name Kevlar®. Braiding is a technique known per se which consists in producing a textile structure, in this instance a tubular one, in which the constituent threads or rovings are crisscrossed at a determined angle with respect to the longitudinal direction of the product, with longitudinal threads. Braiding onto a mandrel generally makes it possible to produce special profiles such as tubes, cones, pipes with elbows, etc.

Figure 6:
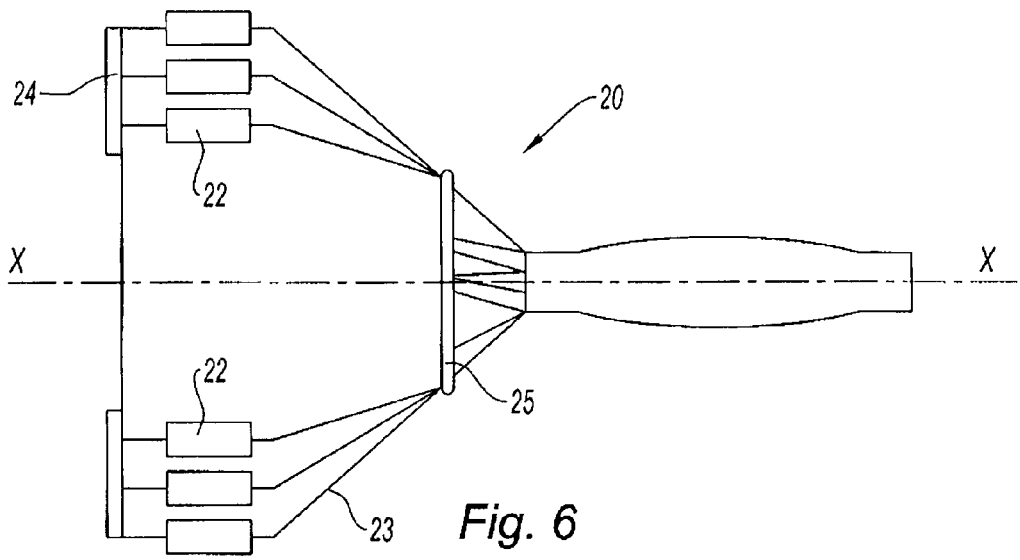
FIG. 6 schematically shows a braiding installation.

The machine 20 depicted schematically in FIG. 6 comprises a plurality of reels 22 mounted on supports distributed in a circle over several levels in a cylinder 24 coaxial with the mandrel that is to be covered. The latter is mounted on a carriage which travels along the axis of the cylinder 24 as the braid is formed. The rovings 23 fed by the reels are braided continuously in a circle over the mandrel thereby forming a tube. The rovings are kept under tension by a coaxial ring 25.

According to one embodiment the braiding is three dimensional, both axially and radially, the rovings being interlaced in such a way that the layers can no longer be distinguished. The braiding process is performed by a relative change in the position of the roving carriers with respect to one another. The angle of the rovings is chosen from the range 20° to 80°. According to another embodiment, the braiding is monolayer with several layers potentially being stacked on top of each other.

Figure 2:
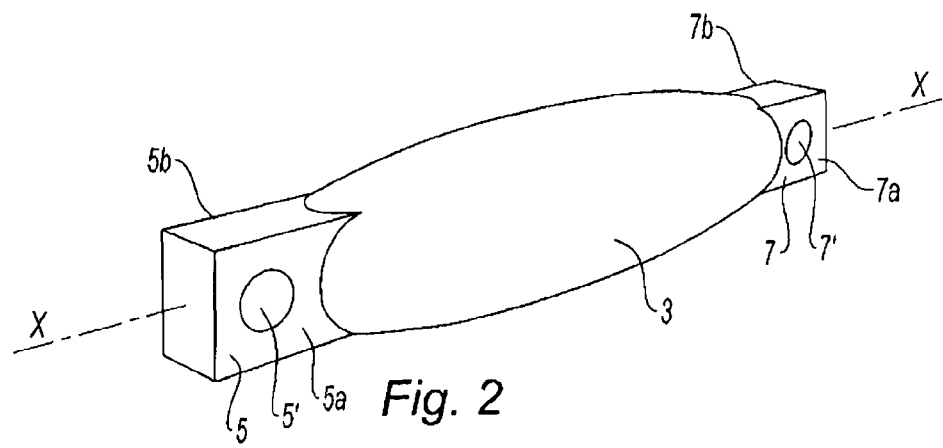
FIG. 2 shows a mandrel for producing a preform according to the invention.

FIG. 2 is a perspective view of the mandrel 3 assembled with the two reinforcements 5 and 7. The parallelepipedal shape of the reinforcement with two opposite main faces 5a, 5b and 7a, 7b respectively, parallel to the axis XX of the preform may be seen. The width of these faces is smaller than the largest diameter of the mandrel 3 and is pierced with a bore 5' and 7' respectively, intended to accommodate a connecting member of the component. The thickness of the reinforcement is smaller than the width of the main faces.

Figure 3:
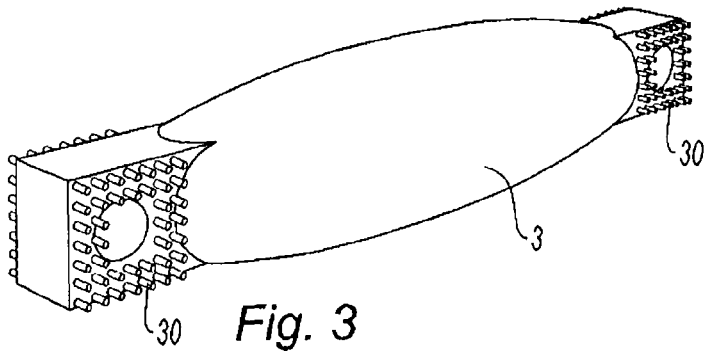
FIG. 3 shows the mandrel of FIG. 2 on which the pins have been positioned according to one embodiment of the invention.

According to the invention, pins 30 are set out on the main faces 5a, 5b and 7a, 7b of the reinforcements, as may be seen in FIG. 3. These pins, which are made of carbon or alternatively of metal, have a diameter, for example, of 1 to 3 mm and are fixed in the mass of the reinforcement to constitute anchor points. They are set out in a grid pattern around the bores 5' and 7' with a spacing in the direction parallel to the axis XX and a spacing in the direction transverse to this axis with, for example, a density of 1 to 3 pins per $cm^2$. In the example illustrated, the pins have been set out uniformly. The height of the pins is at most equal to the thickness of the fibrous structure that is to be applied.

The pins 30 are arranged in the reinforcement either in a first region situated between the mandrel 3 and the region of the bore 5', 7' or in a second region situated on the other side of the bore 5', 7 on the opposite side to the mandrel 3, or in both said first region and said second region.

In this way, the connection between the reinforcement and the fibrous structure 9 when the link rod is liable to work either in compression or in tension or in compression and in tension is strengthened.

According to one advantageous embodiment, the pins are formed of pins which pass through the reinforcement and protrude from both sides. In such an instance, the reinforcement is preferably fibrous. This then ensures effective catching of the braided fibers.

Figure 4:
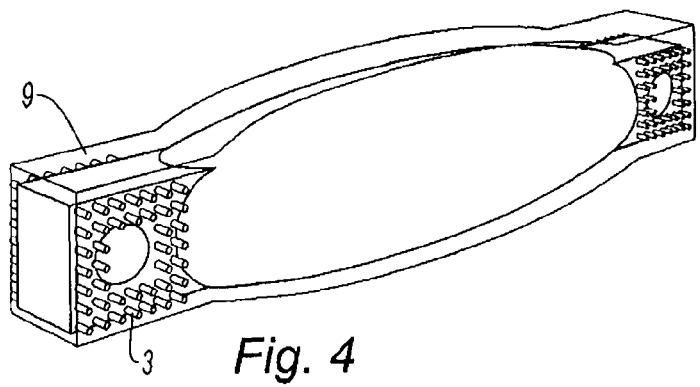
FIG. 4 shows the preform produced from the mandrel of FIG. 3.
Figure 7:
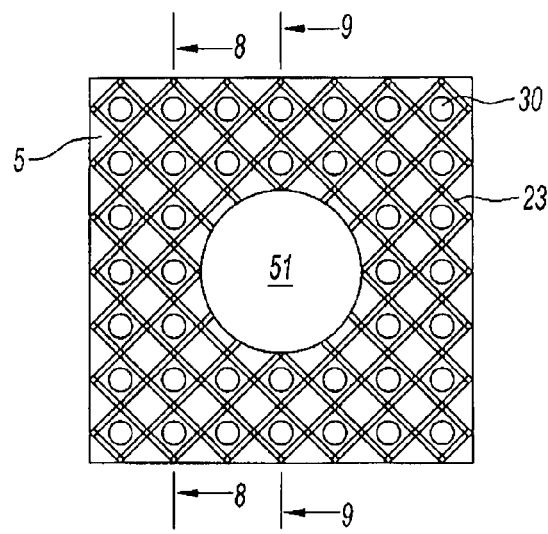
FIG. 7 schematically shows the relative arrangement of the rovings of the braid in relation to the pins secured to the end fitting reinforcement.

When the assembly comprising the mandrel and the reinforcement has thus been prepared, the rovings are then braided around this assembly by placing it in a machine of the kind discussed above. Braiding begins at one end of the assembly and finishes downstream of the other end, see FIG. 4. Braiding is done in the conventional way except in the region of the reinforcement. In that region, the rovings are braided in such a way that they crisscross around the pins 30. A roving may also be split so that it runs on each side of a pin. FIG. 7 depicts one example of how the rovings 23 are laid out in the region of the reinforcements 5 and 7. The rovings form a cross shape around the pins 30. One objective is to ensure mechanical anchorage of the braid on the reinforcements and 7. Thanks to this arrangement, axial load is transmitted from the connecting member housed in the bore partially directly from the connecting member to the braid and partially from the connecting member to the reinforcement and then from the reinforcement to the braid by the pins and also at the same time by shearing of the matrix.

Depending on how the pins are positioned on the reinforcement on one side of the bore or the other with respect to the body of the link rod, it is possible to promote the strengthening of the connection between the reinforcement and the braided composite structure 9 when the link rod is likely to be working either in compression or in tension or both in compression and in tension.

It should be noted that the forces between the reinforcement and the fibrous composite structure are transmitted essentially through the matrix that forms the interface between the reinforcement and the structure. The pins work in shear but their purpose is primarily to prevent the two contacting walls from separating; they work mainly in tension/compression and improve the resistance to delamination.

In FIG. 7, the reinforcement 5 is pierced with the orifice 5' beforehand and the pins are then positioned a minimal distance away from the orifice to allow suitable braiding around the pins. The solution of piercing the orifices after the end fitting has been braided and cured is, however, also conceivable.

Figure 9:
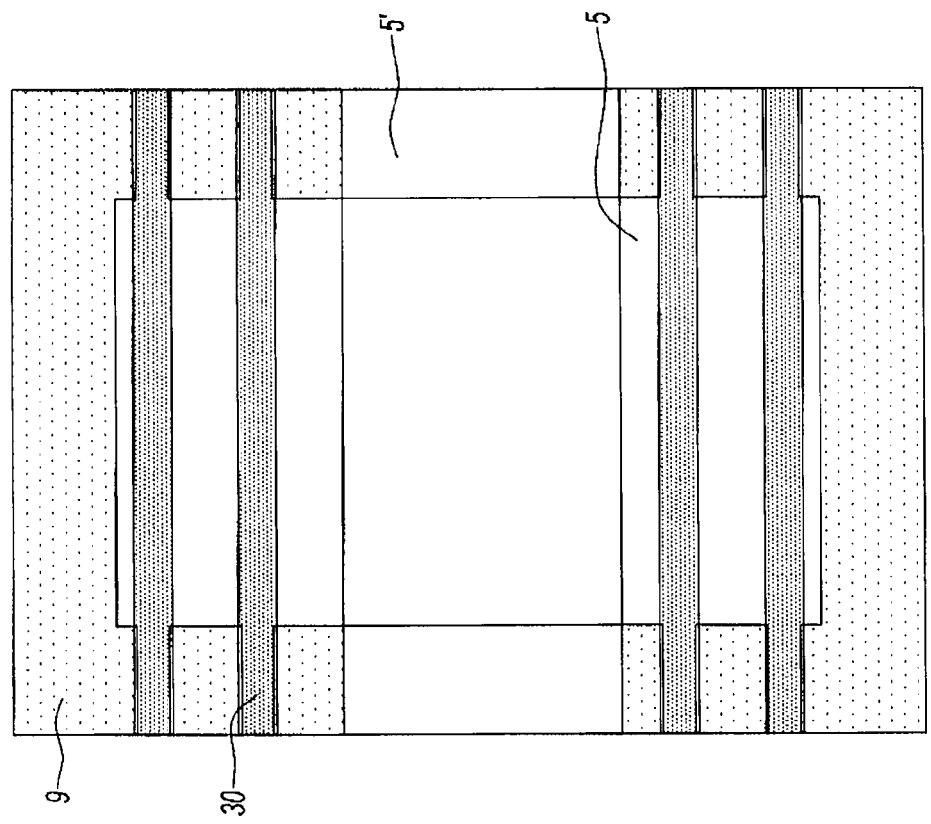
FIG. 9 schematically shows the end fitting in an enlarged view in section on the plane 9-9 of FIG. 7.
Figure 8:
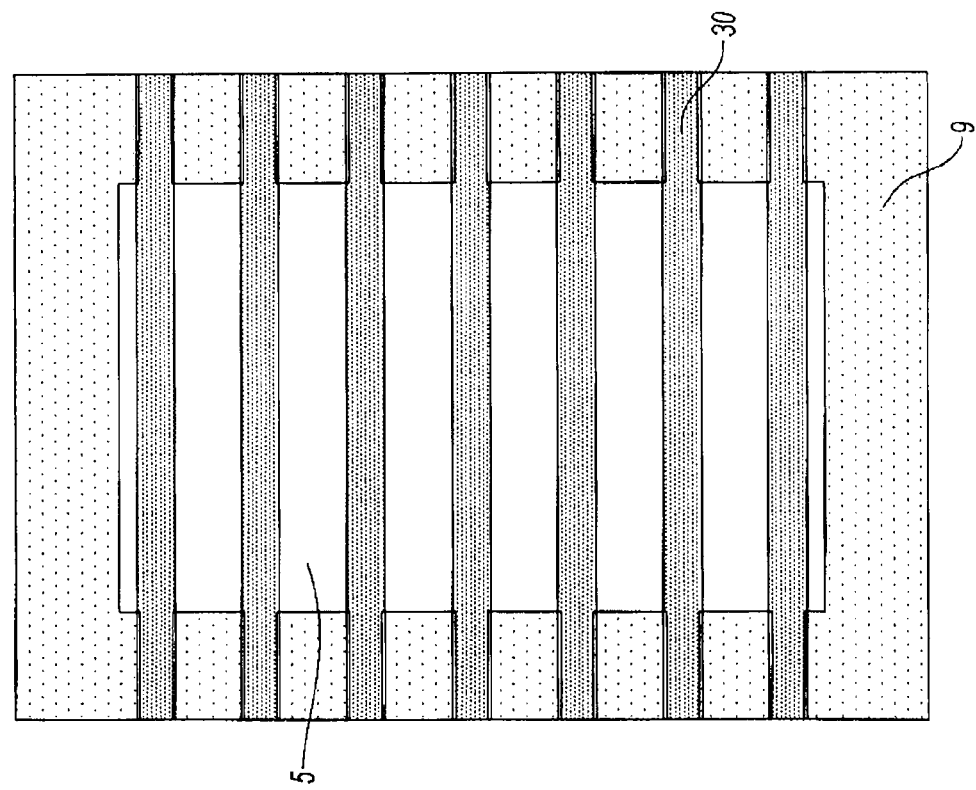
FIG. 8 schematically shows the end fitting in an enlarged view in section on the plane 8-8 of FIG. 7.

FIGS. 8 and 9 are views in cross section of one of the two reinforcements that form the end fittings after the fibrous structure has been braided, in the case where the pins 30 are through-pins. The reinforcement 5 has, for example in this instance, seven pins 30 perpendicular to the axis XX and to the main faces passing through it. The fibrous structure 9 has been braided around the two ends of the pins 30. FIG. 9 more specifically shows the layout of the pins on each side of the orifice 5'.

When braiding is over, the preform is impregnated. An impregnation technique such as the RTM technique, where RTM stands for Resin Transfer Molding, is used. With this technique, which is known per se, the preform is placed in the cavity of a mold suited to the shape of the component that is to be produced. The mold is placed under vacuum and a low-viscosity resin is injected into the mold. The resin that forms the matrix is then cured by raising the entire assembly to the curing temperature. It should be noted that this step completes the curing, where appropriate, of the material that forms the reinforcement.

Figure 5:
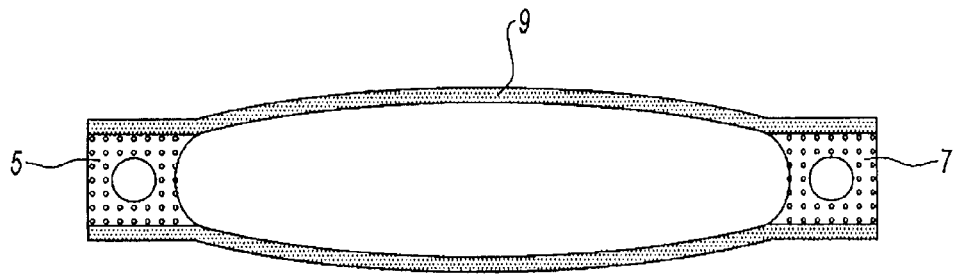
FIG. 5 shows the component obtained once the mandrel has been eliminated.

Depending on the nature of the mandrel 3, this mandrel may be eliminated during the curing step or alternatively after this step, or the mandrel may even be kept. Ultimately, the component obtained is as depicted in axial section in FIG. 5, with a wall 9 consisting of a braid in a matrix. At the ends, this component comprises an end fitting incorporating a reinforcement. A metal ring extending from one face to the other is mounted in the bore of the end fitting.

One advantageous but nonlimiting method of manufacture involves the following steps:

creating a mandrel of a fibrous material preimpregnated with organic resin, creating, separately, one or more reinforcement(s), likewise using a fibrous material preimpregnated with organic resin, inserting pins into the reinforcement or reinforcements, possibly using vibration, for example using a technique known as "z-pinning", assembling and bonding the mandrel and the reinforcement or reinforcements, pre-curing the preimpregnated assembly so that it can be handled and braided without deformation, braiding the fibrous structure that forms the preform around the mandrel with the reinforcement or reinforcements, injecting resin into the preform, followed by the complete curing of the component, by co-baking, machining the interfaces and incorporating the rings of the connecting member.

The invention claimed is:

1. A process of manufacturing a structural component with an end fitting made from an organic matrix composite, the process comprising:
   providing a mandrel with a main axis;
   providing a reinforcement at an end of the mandrel to present an assembly, the reinforcement including a bore which pierces through main faces of the reinforcement, the bore including an axis perpendicular to the main axis of the mandrel;
   inserting pins into the reinforcement such that the pins project outwardly from the main faces of the reinforcement, all of the pins being perpendicular to the main axis of the mandrel and to the main faces of the reinforcement;
   braiding rovings of a fibrous material onto the assembly, the braiding of the rovings in a region of the reinforcement crisscrossing around the pins forming a cross shape around the pins to produce a preform;
   impregnating the preform with an organic resin; and
   curing the impregnated preform,
   wherein the bore houses a connecting member.

2. The process as claimed in claim 1, wherein a reinforcement is positioned at each end of the mandrel.

3. The process as claimed in claim 2, wherein the reinforcement is a fibrous reinforcement.

4. The process as claimed in claim 3, wherein the reinforcement is formed of a resin impregnated fibrous material.

5. The process as claimed in claim 4, wherein, with the mandrel formed of a resin impregnated fibrous material, the resin of the mandrel and of the reinforcement is precured before the fibrous structure is braided and the assembly undergoes full curing once resin has been injected into the fibrous structure.

6. The process as claimed in claim 1, wherein the reinforcement has a rectangular cross section.

7. The process as claimed in claim 1, wherein the pins are incorporated into the reinforcement either in a first region situated between the mandrel and a region of the bore, or in a second region situated on another side of the bore in relation to the mandrel, or in both the first region and the second region.

8. The process as claimed in claim 1, wherein the pins are arranged in a grid pattern, spacing between the pins allowing at least one roving and the crossing of two rovings to be accommodated therein.

9. The process as claimed in claim 1, wherein a height of the pins is at most equal to a height of the braiding.

10. The process as claimed in claim 1, wherein the pins are made of metal or of carbon.

\* \* \* \* \*